Sept. 8, 1942.                C. W. HANSEL                2,295,470
                        OPTICAL PROJECTION APPARATUS
                          Filed Nov. 16, 1939          4 Sheets-Sheet 1

INVENTOR.
Carl William Hansel
by his Attorneys
Young, Emery & Thompson

Sept. 8, 1942.   C. W. HANSEL   2,295,470
OPTICAL PROJECTION APPARATUS
Filed Nov. 16, 1939   4 Sheets-Sheet 3
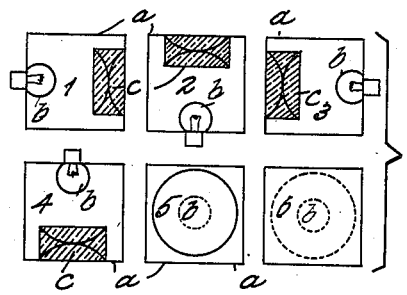
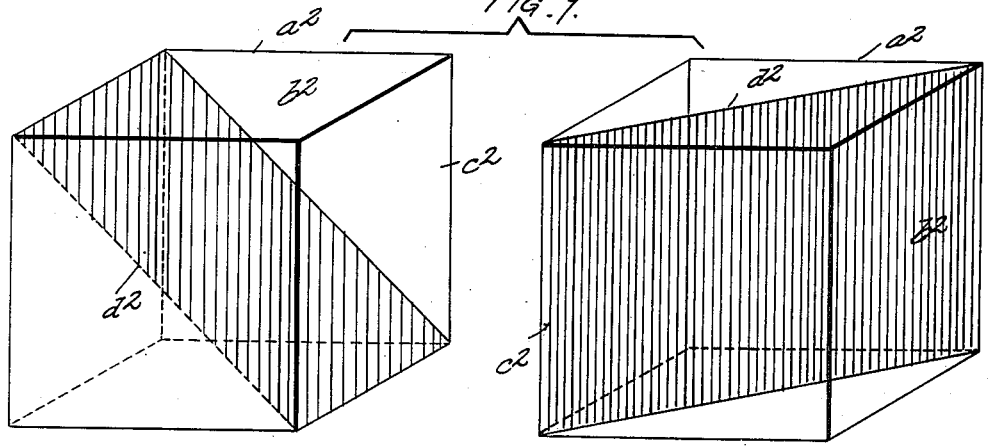
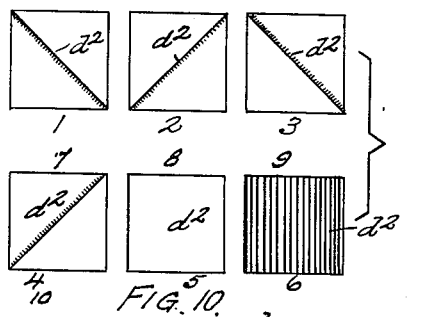
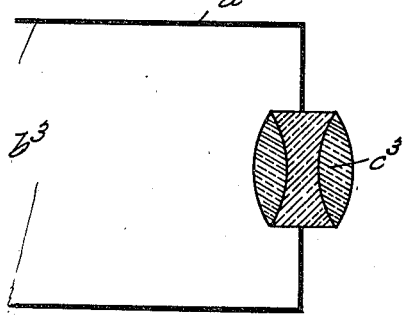
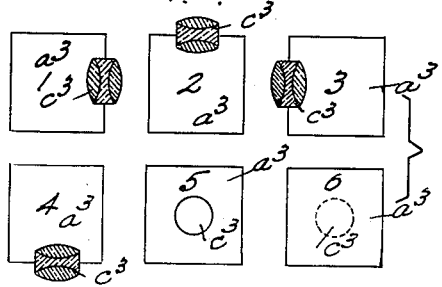
INVENTOR.
Carl William Hansel
By his Attorneys.
Young, Emery & Thompson Sept. 8, 1942.　　　　C. W. HANSEL　　　　2,295,470
OPTICAL PROJECTION APPARATUS
Filed Nov. 16, 1939　　　　4 Sheets-Sheet 4

INVENTOR.
Carl William Hansel
by his Attorneys.
Young, Emery & Thompson

Patented Sept. 8, 1942

2,295,470

UNITED STATES PATENT OFFICE 2,295,470

OPTICAL PROJECTION APPARATUS

Carl William Hansel, Bedford, England

Application November 16, 1939, Serial No. 304,855
In Great Britain December 1, 1938

13 Claims. (Cl. 88—24)

This invention relates to apparatus for assembling optical projection apparatus in a variety of different ways for the demonstration and display of objects, apparatus, and experiments and broadly stated comprises a plurality of separate and non-connected functional units of an optical projection system, so combined or arranged in juxtaposition in different ways, usually on or in relation to a supporting or base unit or framework, that such demonstration or displays may be readily carried out.

The invention further comprises the novel combinations and arrangements of parts hereinafter fully described and specifically pointed out in appended claims.

The apparatus of the present invention is designed for educational and industrial demonstrations, for example to demonstrate and display all types of apparatus and experiments (physical, chemical, biological, mechanical, etc.) The actual progress of an experiment may be exhibited either in projection or suitably displayed and usually in subdued daylight.

Chemical changes can be studied in progress e. g. colour change of indicators, quantitative experiments with burette, pipette, or measuring jar can be watched by an audience and readings taken by those present. The action of heat on a substance may be studied in projection, effervescence, crystallisation, etc. etc.

Compass needles, electroscopes, special thermometers, galvanometers, etc., may be projected so that their indications may be seen by a whole class.

Ray tracks in smoke or by projection on a white surface may be rendered visible to an audience. Most optical phenomena may be demonstrated in this way.

Ripple tank effects, lines of magnetic force, convection currents in fluids, lantern slides, etc. etc. may be projected on the screen.

The projections may be carried out at close range with a reasonable magnification, or a much larger image may be obtained with a longer throw. In all cases the apparatus may be arranged to give an erect image with numbers or printed matter uninverted. This may be done with projection on to an ordinary screen or by transmitted projection.

The apparatus is easily extended to give episcopic or microscopic projection.

Among other important uses to which the invention may be applied it is possible to project episcopically a picture or object placed horizontally or vertically, or the subject for episcopic projection may be mounted at the top, bottom, front, or ends of the base or other unit provided.

Invention is also easily applied to complicated forms of projection apparatus, for example, double projection may be carried out using two assemblies of units on a single base unit, or two base units may be used.

Further cine-projection is easily carried out by providing units carrying the functional parts of a sound projection system, for example, an illumination unit with gate, units for supporting film spools, illumination unit for sound track, and unit carrying photo-electric cell and auxiliary apparatus.

Or again the invention may be applied to the construction of apparatus for the projection of industrial processes whilst these are in operation, machine parts and mechanisms, profiles, contours, maps, wind tunnels, and many other objects and operations of industrial importance.

Examples of apparatus constructed according to the invention and their uses are illustrated in the accompanying drawings mostly in diagrammatic form and in which:

Fig. 6 shows arrangements of the illumination unit illustrated in Fig. 5.

Fig. 7 shows two perspective views of a form of reflection unit in two positions of use.

Fig. 8 is a diagram showing positions of use of the reflection unit illustrated in Fig. 7.

Fig. 9 shows in section a form of projection unit, and Fig. 10 various positions of use of said unit.

Figure 1:
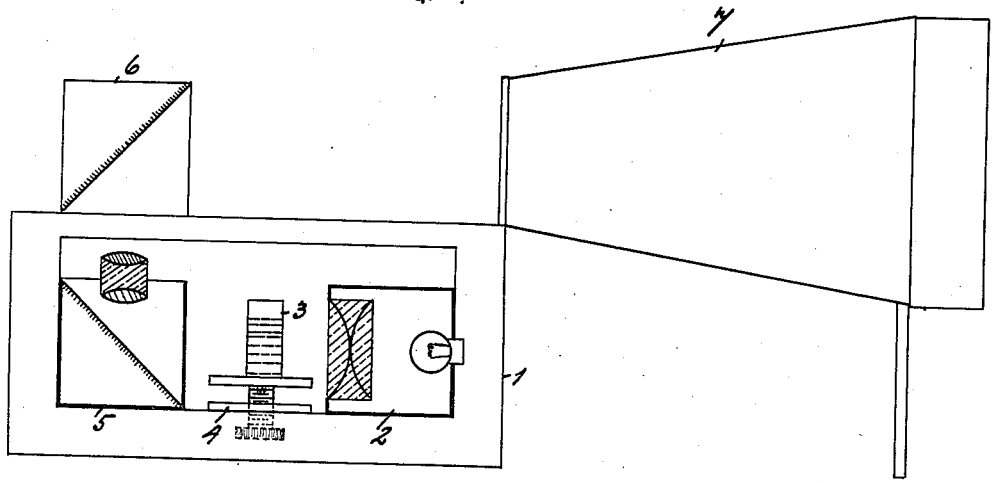
Fig. 1 shows an assembly of units for projecting the image of an erect object.

Fig. 1 as aforesaid shows one example of an assembly of units for projecting the image of an erect object, for example an electrolytic cell, on a translucent screen. The assembly consists of base unit 1 (see Fig. 2); illumination unit 2 (Fig. 5) in position A6, 3; the object 3 resting on a stage of adjustable height 4 (Fig. 15) the combined reflection and projection unit 5 (Fig. 11) in position A4, 1, 2; the reflection unit 6 (Fig. 7) in position B4, 4; and a shielded translucent screen 7 (Fig. 13) in position B7, 1, the positions being described later with regard to Fig. 3.

Figure 2:
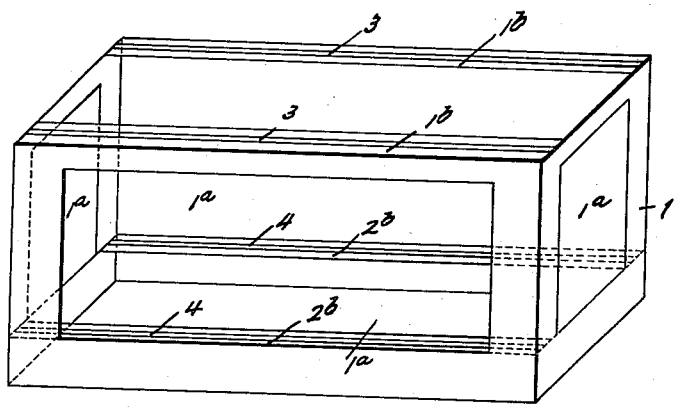
Fig. 2 is a perspective view of a base unit commonly employed with most assemblies of units.
Figure 3:
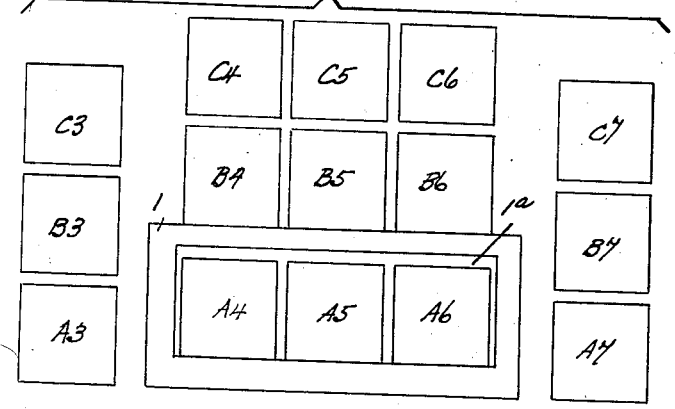
Fig. 3 shows arrangements of levels and positions in which various functional units may be aranged in relation to the base unit.

Fig. 2 shows a base unit in the form of a long box 1 having large central portions $1^a$ open at the front, ends, top, and bottom. Any of the openings may be fitted partially or entirely with panels, screens, or other mounts or fittings. Ledges $1^b$, $1^b$ and $2^b$, $2^b$; and rails or beading 3, 3, and 4, 4, are provided at the top and near the bottom of said base unit so that other units may rest in various positions inside or above it. The positions of any of these units may be adjusted easily and quickly without altering their optical alignment by sliding the units between the rails.

The front of the base unit may be provided with terminal boards, pegs, hooks, projections, and the like, for mounting wires, instruments, strings, etc. in front of a sheet of frosted glass inset in the front of the unit and illuminated by lamps within it. In this way, objects mounted in a vertical plane may be displayed against an illuminated background.

Units may be mounted at three different levels (see Fig. 3) viz: in the base unit or low level A, on said unit or intermediate level B, and above a unit resting on the base unit or high level C. A higher level is not impossible but is seldom used. Thus said Fig. 3 indicates how the position of each unit in an assembly may be specified or denoted. The illustration applies to an observer looking towards the open front of the base unit. The approximately central position of a unit is indicated by a numeral 5 placed after the position letters A, B or C which specify the level of the unit. Positions to the right of the central position are indicated by a higher numeral than 5 viz. 6 and positions to the left of said central position by a numeral less than 5 viz. 4 the lower or higher the numeral the further is the unit from the central position. For example, A6 indicates that the unit is mounted inside the box (low level A) and to the right of the central position (numeral 6). B3 denotes that the unit is at the intermediate level (resting on another unit) and to the left of the base unit.

Figure 4:
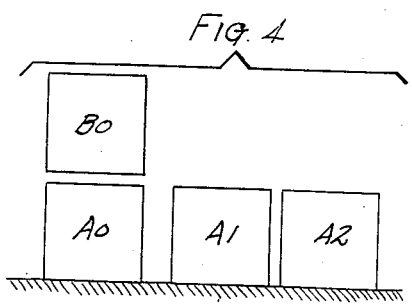
Fig. 4 shows dispositions of functional units when no base unit is employed.

Fig. 4 indicates how the position of a unit is specified if the base unit 1 is not used. The first unit beginning from the left at lowest level is A0, the next A1, etc.

The base unit 1 may be provided with a vertical rod or rods carrying clamps, retort rings and the like for supporting apparatus such as chemical glassware, wire gauze, scales, and such. Experiments for projection which involve a source of heat may be carried out, the effects being exhibited whilst the experiment is in progress. The open top of the base unit enables a source of heat such as a Bunsen flame to be used inside the unit without danger of fire.

Figure 5:
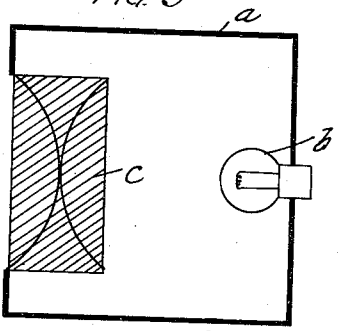
Fig. 5 is a section showing one form of illumination unit.

Fig. 5 shows a section of an illumination unit 2 (Fig. 1) consisting of a cubical box $a$ fitted with an electric lamp $b$ capable of universal adjustment in position with respect to a condenser $c$.

The said illumination unit may be arranged in any one of six positions numbered 1 to 6 in Fig. 6 the numerals being used to specify the orientation of the unit. The orientation number depends on the direction in which the light leaves the unit; if to the right (1), upwards (2), left (3), downwards (4), forwards (5), and backwards (6).

The position and orientation of the illumination may be specified as for example, B5, 3. This indicates that the unit is in the position B5, and orientation 3 that is, light leaves the unit in a direction to the left.

Fig. 7 shows two positions of a reflection unit consisting of a cubical box $a^2$ with open sides $b^2$ and $c^2$ and fitted with a plane mirror $d^2$ mounted diagonally in the box.

Fig. 8 shows (in elevation) six positions of the reflection unit, numbered 1 to 6 in which the plane of the mirror $d^2$ makes 45° with the vertical and the horizontal. This figure also shows (in plan) four additional positions of the reflection unit numbered 7 to 10 in which the plane of the mirror $d^2$ is vertical. The orientation of the reflection unit may be specified by the numbers 1 to 10.

Fig. 9 shows a section of a projection unit consisting of a cubical box $a^3$ with one or two open sides $b^3$ and provided with an adjustable objective $c^3$. This unit may have any of the orientations indicated by the numbers 1 to 6 in Fig. 10. The full circle indicates that the objective is facing forwards and the dotted circle that the objective is facing basewards.

Figure 11:
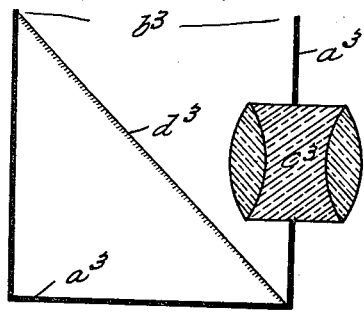
Fig. 11 shows in section a combined reflection and projection unit.

Fig. 11 shows a section of a combined projection and reflection unit consisting of the projection unit $a^3$ of Fig. 9 with open side $b^3$ and with a plane mirror $d^3$ mounted diagonally to deviate axial rays of light through 90° either before or after passing through the objective. The mirror may be hinged so that it may swing out of the path of the light if desired and the unit then becomes equivalent to the projection unit of Fig. 9.

The reflection and projection unit of Fig. 11 may be used in a large number of different orientations. The several positions of the reflection unit may each be combined with more than one position of the objective. The orientation of this unit may be expressed by means of two numbers, the first giving the orientation of the reflection unit and the second that of the objective. For example, reflection and projection unit B6, 3, 4; indicates position B6, with the mirror facing to the left (orientation 3), and the objective facing downwards (orientation 4); or, A4, 10, 4; indicates position A4, with the mirror facing to the right (orientation 10—plane of mirror vertical) and the objective facing forwards (orientation 4).

Figure 12:
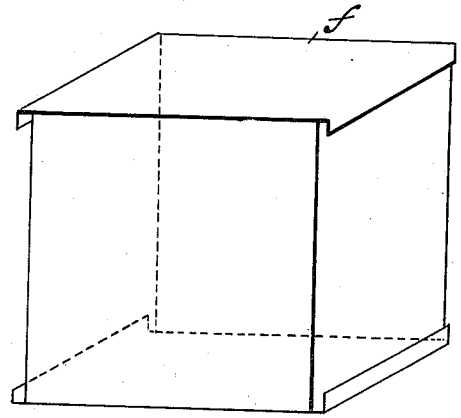
Fig. 12 is a perspective of a general unit adapted for use with various forms of apparatus.

Fig. 12 shows a general unit $f$ on which various forms of apparatus may be mounted. It consists of a skeleton cube, any side or sides of which may be closed, open, or fitted with apparatus. For example, a square plate with holes, slits, or other cuttings or mountings, may be inset in one of the faces of the cube, or the plate may carry a stop, lens, diffraction grating, or the like. The plate or other fittings may be inset in any of the faces of the general unit and secured by fasteners, slots, grooves, and the like. In specifying the make up and mounting of the general unit, it is understood that each side is closed except the ones specially referred to by orientation numbers. For example, general unit, B5, 1 (lens) 3 (vertical slit); indicates position B5, a lens is mounted centrally in face 1 (facing right), and a vertical slit in face 3 (facing left). It is understood that all apparatus is mounted centrally in the faces of the general unit unless otherwise specified. In the previous example the faces, 2, 4, 5, 6, of the general unit are assumed to be closed with opaque plates.

Figure 13:
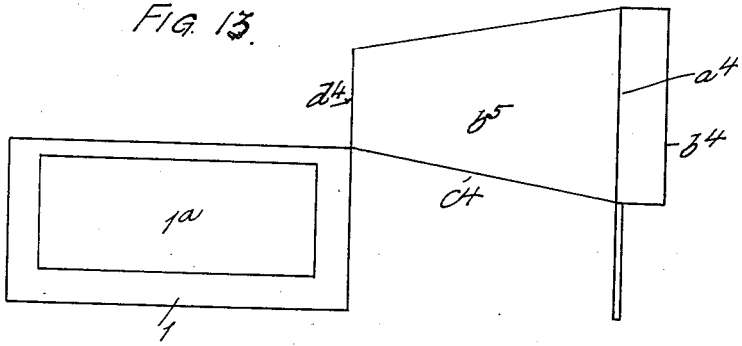
Figs. 13 and 14 show two arrangements of daylight translucent screen relatively to the base unit.

Fig. 13 shows a well known form of daylight translucent screen in position B7, 1 (screen facing right), with the open end $d^4$ resting on the base of unit 1. It consists of a translucent screen $a^4$ shielded from external light by front shields $b^4$ and at the back by an opaque truncated pyramid $b^5$ open at its ends $c^4$. The light enters at the narrow end $d^4$.

Figure 14:
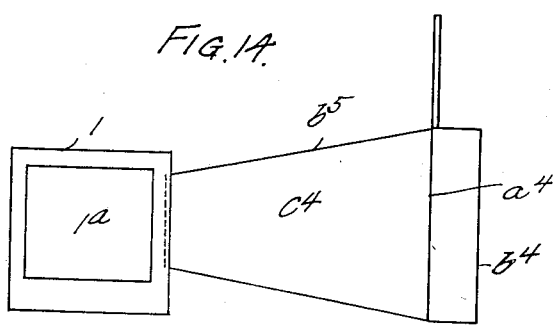

Fig. 14 shows the daylight translucent screen $a^4$ in the position A5, 4 (screen facing forwards). It will be observed that the legs of the screen must be used for positions B, and the screen is inverted so that the legs are not used for position A.

Figure 15:
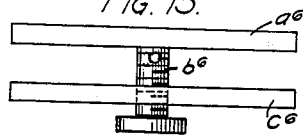
Fig. 15 shows an adjustable stage or mounting for projection apparatus for use with the base unit.

Fig. 15 shows a stage of adjustable height on which apparatus may be mounted for projection. It consists of a plane rectangular stage $a^6$ detachably mounted on a central screw $b^6$ which engages centrally with a rectangular base-plate $c^6$. The said base-plate rests with small clearance between the parallel beading 3—3, 4—4 of the base unit 1, so that it may slide in the direction of its length.

Figure 16:
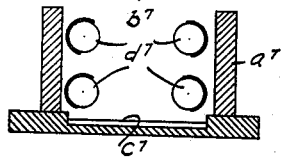
Fig. 16 shows in section a form of illumination unit specially adapted for use with episcopic projection and Fig. 17 shows another form of illumination unit adapted for use with the base unit and having means for compound adjustment of the illuminating means.

For episcopic projection, a special illumination unit or units may be used. Fig. 16 shows in section one form suitable for this purpose. It consists of a flat box $a^7$ with an open base $b^7$ and the top provided with a glass window $c^7$. Lamps and reflectors $d^7$ are fitted to the sides of the box so that printed matter, leaves, and other objects in contact with the glass window $c^7$ are strongly illuminated. Half-silvered tubular lamps $d^7$ may be used. The top is just wide enough to slide between the parallel beading of the base unit 1 with the sides between the ledges.

Figure 17:
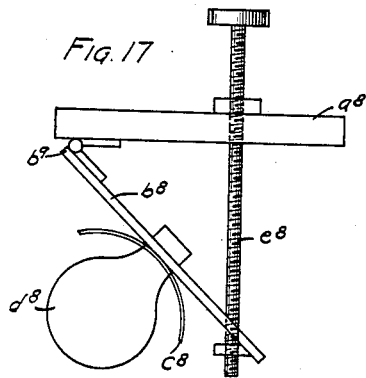

Fig. 17 shows another form of illumination unit which may be used. It consists of a rectangular base-plate $a^8$ which slides between the aforesaid beading of the base unit 1. An inclined and slotted support $b^8$ for a lamp $d^8$ and reflector $c^8$ may be hinged at $b^9$ to the base-plate so that the support may be adjusted to any desired angle with said base-plate by means of an adjusting screw $e^8$. The lamp $d^8$ of high candle power and the reflector $c^8$ may be fixed in any desired position along the slot of the support $b^8$. With the object resting on a flat plate at the level of the lower ledges of the base unit and in position A5, two illumination units similar to Fig. 17 may be used, one in the position A4, and the other in position A6. If the object to be illuminated rests on the top of the base unit, the base-plate of the illumination unit rests on the lower ledges of the base unit. If the object is supported on the lower ledges of the base unit, the base plate of the illumination unit rests on the upper ledges of the base unit with the lamp below.

Some examples may now be given of assembling of the unit into apparatus suitable for various types of projection. It is to be noted that in most cases more than one assembly of units is effective for any particular type of projection. Again, no matter what object or printed matter is used for projection, the projection may be thrown on an opaque or translucent screen without inversion of any kind in the image.

1. Simple projection of a slide or film.

Illumination unit, B4, 1; slide or film carrier and object; objective unit or reflection and projection unit with mirror swung out of the path of the light B6, 1; opaque or translucent screen.

2. Projection of pond life, electroscope, chemical apparatus, etc. (erect object).

(a) Illumination unit B6, 3; reflection and projection unit, B4, 1, 2; reflection unit C4, 1; general unit C6, 1 (ground glass plate), 3 (open) or opaque screen instead of general unit.

(b) Ilumination unit, A6, 3; object on stage or supported; reflection and projection unit A4, 1, 2; reflection unit B4, 4; opaque or translucent screen B7.

3. Projection of protractor, lines of magnetic force, compass needle, etc. (horizontal object).

Illumination unit A4, 2; object resting on illumination unit; reflection and projection unit B4, 4, 1; opaque screen or translucent screen, B7, 1.

4. Episcopic projection of printed matter, objects, or apparatus without inversion of image (object horizontal or upright or inverted).

(a) Object, B4, resting horizontally on the glass plate of the special illumination unit of Fig. 16; reflection and projection unit, A6, 1, 1; opaque screen.

(b) Object, B4, resting horizontally on the special illumination unit of Fig. 16; reflection and projection unit, A4, 1—1; reflection unit A6, 9; translucent daylight screen A6, 5.

(c) Horizontal object, A5; two special illumination units as in Fig. 17; A4 and A6; reflection and projection unit, B5, 6, 4; screen.

(d) Object, B4, resting horizontally on the special illumination unit of Fig. 16; reflection unit A4, 1; reflection and projection unit, A6, 2, 3; reflection unit B6, 6; translucent screen at back of base unit B6, 6.

(e) Upright object A6, in contact with illumination unit of Fig. 16; reflection unit, A6, 2; reflection and projection unit, B6, 3, 3; general unit B4, 1 (open), 3 (plate of frosted glass).

(f) Inverted object, A5, in front of base unit and in contact with illumination unit of Fig. 16, A5; reflection unit, A5, 5; reflection and projection unit B5, 6, 4; translucent daylight screen B5, 6.

5. Projection through an ordinary microscope with the eyepiece removed.

(a) Illumination unit, A6, 3; microscope without eyepiece on stage with mirror reflecting the light upwards, A4; reflection unit B4, 4; general unit, B6, 1 (frosted glass plate), 3 (open).

(b) Illumination unit A4, 1; microscope without eyepiece on stage with reflector deviating the light upwards, A6; reflection unit, B6, 4; daylight screen, B7, 1.

6. Projection of a spectrum.

Illumination unit, A4, 2; plate with rectangular aperture in frame resting on illumination unit; reflection and projection unit, B4, 4, 1; general unit, B5. 1 (diffraction grating), 3 (open); opaque screen.

7. Projection of rays of light in smoke.

Illumination unit, A6, 5; plate with holes mounted in a square frame; general unit, A5, 1 (open), 3 (lens), 5 (open), 2 and 4 and 6 (black plates); top of base unit covered with black plate.

Many other examples could be given including the projection of light rays on a white screen (vertical or horizontal), experiments illustrating the path of rays of light through optical instruments, refraction and total reflection of light, interference and polarisation of light, waves on the surface of a liquid, etc.

In the previous examples, the units have invariably been resting in standard positions with their bases horizontal. For some demonstrations, a unit may be tilted, or turned through an angle in a horizontal plane. For example, in demonstrating refraction and total reflection of light, it is necessary to tilt the reflection unit so that a ray of light reflected from it may meet the surface of a medium (turbid liquid) at various angles of incidence.

Various accessory apparatus is required for carrying out experimental work in the demonstration apparatus. In some cases it is desirable to use apparatus of special size, form, or construction, for use with the units. For example, plates with apertures, slits, holes, and the like, may be inset in the general unit or in a square frame of the same size as the general unit. Again, for chemical demonstrations, miniature apparatus is desirable for projection such as flasks, stands, burettes, and the like.

It is intended in use to furnish the necessary or desirable accessory apparatus for association with the units, to provide complete assemblies of apparatus for the universal demonstration or display of scientific experiments.

I declare that what I claim is:

1. In optical projection or display apparatus the combination of a supporting base member of open construction, pairs of supporting elements and guide rails at a plurality of levels in said base member, and a plurality of units of generally rectangular form and each containing an element of a projection or display device having its exterior shaped and dimensioned to be capable of resting in a plurality of stable operative positions and orientations upon said supporting elements and at different levels in relation to the supporting elements of said base member, each of said units having free or sliding movement in relation to the base member for relative adjustment thereto and in frictional connection relatively thereto and to each other.

2. In apparatus for optical projection and display the combination of a supporting base of open frame construction, a plurality of pairs of parallel and horizontal supporting elements and guides disposed at different levels within said base, and a plurality of units of an optical projection apparatus, said units being of generally rectangular form and adapted to rest and slide on said supporting and guiding elements, said units being frictionally supported upon said elements and guides for operative connection with each other and the base-member and free for movement thereon at their supporting edges.

3. In an optical projection or display apparatus the combination of a base of open frame construction provided with pairs of supporting elements and guide rails and a plurality of separate units of generally rectangular form adapted for assembly of numerous alternative forms of apparatus for optical projection and display, each of said units containing some element of an optical projection or display device and being shaped, dimensioned and constructed in relation to the spacing of the supporting elements and guide rails of the base and to each other for co-operative assembly on said base member in a plurality of alternative positions and orientations, each independently of each other, by placing the units in any desired position, orientation and horizontal spacing on the base member, said units being frictionally supported upon said elements or guide rails, and having free sliding movement thereon.

4. In apparatus for optical projection or display the combination with a supporting base of open construction, having pairs of spaced horizontal and parallel guiding members at different levels, of a plurality of units of generally rectangular form cooperating with said base for the assembly of optical projection and display devices in numerous alternative forms, said units including a reflection unit comprising a plane reflector mounted with its reflecting surface centrally and obliquely to the light beam in an external rectangular housing open or transparent on the two sides facing said reflector and frictionally supported on said parallel guiding members for free sliding movement of the unit between the base guiding members.

5. In apparatus for optical projection or display the combination with a supporting base of open construction, having spaced horizontal and parallel guiding members at different levels, of a plurality of units of generally rectangular form cooperating with said base for the assembly of optical projection and display devices in numerous alternative forms, said units including a combined reflection and projection unit comprising a rotatable plane reflector capable of being fixed in operative or non-operative positions in relation to a lens system mounted centrally in one face of an exteriorly rectangular housing having at least one open or transparent face for admission or transmission of a light beam, said housing being frictionally supported on said parallel guiding members for free sliding motion of the unit between the base guiding members at a plurality of levels, and being dimensioned, shaped and constructed to have a sliding fit between said guiding members when placed in any orientation between them.

6. In apparatus for optical projection or display the combination with a supporting base of open construction, having pairs of spaced horizontal and parallel guiding members at different levels, of a plurality of units of generally rectangular form cooperating with said base for the assembly of optical projection and display devices in numerous alternative forms, said units including a rectangular supporting unit of skeleton structure, each face of which may be open, closed or fitted with various devices or objects adapted to be brought into operative relationship with a light beam traversing the apparatus and said unit being frictionally supported on said guiding members for free sliding motion between said guiding members at a plurality of levels when placed in any orientation, position or level relatively thereto.

7. In apparatus for optical projection or display the combination with a supporting base of open construction, having spaced horizontal and parallel pairs of guiding members at different levels, of a plurality of units of generally rectangular form cooperating with said base for the assembly of optical projection and display devices in numerous alternative forms, a shielded open ended screen having its open end provided with a rectangular frome, so constructed and dimensioned as to be frictionally supported on the guiding members of the base and said screen having supports dimensioned in relation to the spacing of said guiding members.

8. In apparatus for optical projection or display the combination with a support base of open construction, having pairs of spaced horizontal and parallel guiding members at different levels, of a plurality of units of generally rectangular form cooperating with said base for the assembly of optical projection and display devices in numerous alternative forms, said units being frictionally supported on said guiding members and including a support for various types of objects to be mounted in operative relation to the light beam of the apparatus, said support comprising a rectangular base plate, a stage supported by said plate, means for adjusting said plate to various levels and said stage adapted to receive objects mounted in cooperative position and relationship to said light beam, and the aforesaid base plate having a sliding fit between the guiding members of the supporting base.

9. In apparatus for optical projection or display the combination with a supporting base of open construction, having pairs of spaced horizontal and parallel guiding members at different levels, of a plurality of units of generally rectangular form cooperating with said base for the assembly of optical projection and display devices in numerous alternative forms, said units being frictionally supported on said guiding members and including an open fronted housing containing illuminating means and having closed sides, the back of which may project in one or more directions provided with an aperture whereby an object in proximity to said aperture may be illuminated by said illuminating means, and the aforesaid back being rectangular and dimensioned in relation to the spacing of the base guiding members.

10. In apparatus for optical projection or display the combination with a supporting base of open construction, having pairs of spaced horizontal and parallel guiding members at different levels, of a plurality of units of generally rectangular form cooperating with said base for the assembly of optical projection and display devices in numerous alternative forms, said units being frictionally supported on said guiding means and including a lamp element comprising a rectangular base plate, a rotatable lamp support adjustably mounted on said base plate and means whereby said lamp may be adjusted and fixed in a number of different positions relatively to said base plate.

11. A projector apparatus assembly for teaching or lecturing purpose comprising a rectangular shaped supporting member or base portion of open construction and having pairs of spaced horizontal and parallel guiding members, and a plurality of separate units of generally rectangular form, said units being frictionally supported by and having a sliding fit between said guiding members, each unit housing some element or portion of the projector apparatus and combinable upon said base portion to form a projecting assembly suitable to project various physical and chemical experiments and the like upon a viewing screen.

12. An apparatus of the character described comprising a skeleton rectangular supporting base having light permeable walls and pairs of horizontal and parallel guiding and supporting elements at a plurality of levels, a plurality of separate units of generally rectangular form, each housing some element or portion of a projection device, said units being constructed and dimensioned to be freely positioned and frictionally supported on any one of their rectangular surfaces on the pairs of supporting elements in combined relation with each other to form a projection assembly suitable to project various phenomena upon a viewing screen.

13. An apparatus of the character described comprising a skeleton rectangular supporting base having light permeable walls and pairs of horizontal and parallel supporting and guiding elements at a plurality of levels, a plurality of separate units of generally rectangular form, said units housing illuminating sources, reflectors, projection elements, and combined reflection and projection elements, said units being constructed and dimensioned to be freely positioned and frictionally supported on any one of their rectangular surfaces on the supporting and guiding elements in combined relation with each other to form a projection assembly suitable to project various phenomena upon a viewing screen.

CARL WILLIAM HANSEL.